United States Patent
Hanlon et al.

(12)

(10) Patent No.: US 6,582,530 B1
(45) Date of Patent: Jun. 24, 2003

(54) NON-CHROMATE PROTECTIVE COATING FOR IRON AND IRON ALLOYS AND COATING SOLUTION

(75) Inventors: Thomas R. Hanlon, Colchester, CT (US); Mark R. Jaworowski, Glastonbury, CT (US); Michael A. Kryzman, W. Hartford, CT (US); John H. Vontell, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/237,587

(22) Filed: Sep. 5, 2002

(51) Int. Cl.⁷ .............................. C23C 22/05
(52) U.S. Cl. ................ 148/262; 106/14.12; 148/243; 148/261
(58) Field of Search ................. 106/14.12; 148/243, 148/261, 262

(56) References Cited

U.S. PATENT DOCUMENTS

| | | | | |
|---|---|---|---|---|
| 4,347,085 A | * | 8/1982 | Haselkorn et al. | 148/245 |
| 5,279,649 A | * | 1/1994 | Stetson et al. | 106/14.12 |
| 5,279,650 A | * | 1/1994 | Stetson et al. | 106/14.12 |
| 5,652,064 A | * | 7/1997 | Mosser et al. | 428/472.3 |
| 5,968,240 A | * | 10/1999 | Myers et al. | 106/14.12 |
| 6,368,394 B1 | * | 4/2002 | Hughes et al. | 106/14.12 |

\* cited by examiner

*Primary Examiner*—Anthony J. Green
(74) *Attorney, Agent, or Firm*—Bachman & LaPointe, P.C.

(57) ABSTRACT

A non-chromate protective coating and coating solution useful for coating iron and iron alloys, particularly steel, includes $V_2O_5$, $Ce_2(MoO_4)_3$ or $SrWO_4$ as a corrosion inhibitive component

11 Claims, No Drawings

NON-CHROMATE PROTECTIVE COATING FOR IRON AND IRON ALLOYS AND COATING SOLUTION

BACKGROUND OF THE INVENTION

The present invention relates to a non-chromate protective coating solution and a result coating composition particularly useful as a protective coating on iron and iron alloys.

Chromate-based high temperature aluminum coatings have been used to protect steel components such as, for example, compressor discs from high temperature and atmosphere corrosion damage. While the chromate based aluminum coatings are highly effective, such coatings have lost favor due to health concerns associated with the use of hexavalent chromium.

Naturally, it would be highly desirable to provide a non-chromate protective coating for metal, particularly iron and iron alloys including steel, which would meet industry demands with respect to high temperature and atmospheric corrosion damage protection.

SUMMARY OF THE INVENTION

Accordingly, it is an object of the present invention to provide a non-chromate protective coating for a metal substrate. It is a further object of the present invention to provide a non-chromate protective coating for iron and iron alloy substrates.

It is a still further object of the present invention to provide a non-chromate protective coating solution for forming the non-chromate protective coating.

The foregoing objects or advantages are attained by the present invention.

In accordance with the present invention, a non-chromate protective coating solution comprises from 25 to 75 wt. % $H_2O$; from 10 to 20 wt. % $H_3PO_4$; from 2 to 10 wt. % MgO; from 10 to 50 wt. % Al; and from 0.5 to 10 wt. % of a metal oxide selected from the group consisting of $V_2O_5$, $Ce_2(MoO_4)_3$ and $SrWO_4$. The non-chromate protective coating solution has a pH of between 2.5 to 5.0.

The resulting non-chromate protective coating comprises from 15 to 40 wt. % $H_3PO_4$; from 3 to 20 wt. % MgO; from 20 to 75 wt. % Al; and from 1.0 to 20 wt. % of a metal oxide selected from the group consisting of $V_2O_5$, $Ce_2(MoO_4)_3$ and $SrWO_4$.

Other details of the non-chromate protective coating and coating solution of the present invention are set forth in the following detailed description and example.

DETAILED DESCRIPTION

The present invention relates to a non-chromate protective coating and coating solution particularly useful for coating iron and iron alloys, particularly steel. In accordance with the present invention, the non-chromate protective coating comprises from 15 to 40 wt. % $H_3PO_4$; from 3 to 20 wt. % MgO; from 20 to 75 wt. % Al; and from 1.0 to 20 wt. % of a metal oxide selected from the group consisting Of $V_2O_5$, $Ce_2(MoO_4)_3$ and $SrWO_4$ When $V_2O_5$ is employed as the metal oxide, the preferred non-chromate protective coating comprises from 15 to 25 wt. % $H_3PO_4$; from 3 to 10 wt. % MgO; from 30 to 60 wt. % Al; an d from 1 to 5 wt. % $V_2O_5$. When the preferred metal oxide is $Ce_2(MoO_4)_3$, the preferred non-chromate coating composition comprises from 13 to 20 wt. % $H_3PO_4$; from 3 to 10 wt. % MgO; from 35 to 70 wt. % Al; and from 7 to 20 wt. % $Ce_2(MoO_4)_3$. When the preferred metal oxide is $SrWO_4$, the preferred non-chromate protective coating composition comprises from 13 to 20 wt. % $H_3PO_4$; from 3 to 10 wt. % MgO; from 35 to 70 wt. % Al; and from 7 to 20 wt. % $SrWO_4$. The non-chromate protective coating of the present invention is particularly useful for coating iron and iron alloys, particularly steel.

The non-chromate protective coating solution used to produce the protective coating of the present invention comprises from 25 to 75 wt. % $H_2O$; from 5 to 20 wt. % $H_3PO_4$; from 2 to 10 wt. % MgO; from 10 to 50 wt. % Al; and from 0.5 to 10 wt. % of a metal oxide selected from the group consisting of $V_2O_5$, $Ce_2(MoO_4)_3$ and $SrWO_4$. When $V_2O_5$ is employed as the preferred metal oxide, the coating solution comprises from 50 to 75 wt. % $H_2O$; from 10 to 14 wt. % $H_3PO_4$; from 2 to 5 wt. % MgO; from 15 to 35 wt. % Al; and from 0.5 to 2 wt. % $V_2O_5$. When $Ce_2(MoO_4)$ 3 is employed as the preferred metal oxide, the protective coating solution comprises from 50 to 75 wt. % $H_2O$; from 8 to 12 wt. % $H_3PO_4$; from 2 to 5 wt. % MgO; from 20 to 40 wt. % Al; and from 5 to 10 wt. % $Ce_2(MoO_4)_3$. When $SrWO4$ is employed as the preferred metal oxide, the protective coating solution comprises from 50 to 75 wt. % $H_2O$; from 8 to 12 wt. % $H_3PO_4$; from 2 to 5 wt. % MgO; from 20 to 40 wt. % Al; and from 5 to 10 wt. % $SrWO_4$. It is preferred that the coating solutions have a pH of between about 2.5 to 5.0 preferably between about 3.0 to 4.0. The metal substrate is coated with the solution by processes well known in the art.

The effectiveness of the protective coatings in accordance with the present invention when compared to chromated coatings is demonstrated in the following example.

EXAMPLE

Four carbon steel panels were used as a substrate material. Prior to coating of the panels, each panel was grit blasted, rinsed with deionized water and dried. The coating mixtures were applied to one side of the panels by a paintbrush. The panels were allowed to air dry horizontally overnight. The panels were then additionally dried in an oven at 176° F. for thirty minutes and thereafter cured in a furnace at 625° F. for one hour.

One of the four panels was coated with a solution containing hexavalent chromium. The remaining three panels were coated with protective coating solutions in accordance with the present invention. The coating formulations are presented hereinbelow in Table 1 along with observations made during the preparation of the coating solutions.

TABLE 1

| Formula | $H_3PO_4$ ml | Al 104 g | MgO g | $CrO_3$ g | $V_2O_5$ g | $Ce(MoO_4)_3$ g | $SrWO_4$ g | pH |
|---|---|---|---|---|---|---|---|---|
| 1 | 10.26 | 40.02 | 4.04 | 5.01 | | | | 3.0 |
| 2 | 10.26 | 40.02 | 4.04 | | 1.09 | | | 4.0 |
| 3 | 10.26 | 40.02 | 4.04 | | | 9.51 | | 5.0 |
| 4 | 10.26 | 40.02 | 4.04 | | | | 8.39 | 4.5 |

In order to test the corrosion resistance of the coated panels, a solution was prepared using a mixture of technical grade sulfuric and nitric acids in a volume ratio of 3:1 and diluted with deionized water to a pH of three. Sodium chloride was then added to the solution in an amount of 2500 ppm. The solution simulates a corrosive condensate found in certain service environments, such as those experienced by compressor discs. A diamond-tipped marking tool was used to scribe an "X" from corner to corner through the coating on each coupon. The scribed coupons were then submerged for 15 minutes in the test solution, air dried for one hour, and thereafter put in a furnace at 800° F. for two hours. Finally the coupons were placed for twenty hours in a desiccator at 100% humidity. This sequence was repeated and the coatings were evaluated after 5 test cycles. The observations are set forth hereinbelow in Table 2.

TABLE 2

| Formula | Observations | | Coupon ratings (1 = best) |
|---|---|---|---|
| | Quality of coating before testing | Coupons after 5 test cycles | |
| 1 (Cra$_3$) | Smooth surface and consistent coating thickness | No corrosion | 1 |
| 2 (V$_2$O$_5$) | Smooth surface and consistent coating thickness | No corrosion in the field. Some corrosion in the lower part of one scribe. | 2 |
| 3 (Ce$_2$(MoO$_4$)$_3$) | Smooth surface and consistent coating thickness | No corrosion in the field. Corrosion in the lower part of the scribes. | 3 |
| 4 (SrWO$_4$) | Smooth surface and consistent coating thickness | No corrosion in the field. Corrosion in the lower part of the scribes. | 3 |

As can be seen from Table 2, V$_2$O$_5$ preformed as the best non-chromated metal oxide. While Ce(MoO$_4$)$_3$ and SrWO$_4$ did not perform to the level of V$_2$O$_5$, their performance was acceptable.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A non-chromate protective coating solution comprising:
   from 25 to 75 wt. % H$_2$O;
   from 5 to 20 wt. % H$_3$PO$_4$;
   from 2 to 10 wt. % MgO;
   from 10 to 50 wt. % Al; and
   from 0.5 to 10 wt. % of a metal oxide selected from the group consisting of V$_2$O$_5$, Ce$_2$(MoO$_4$)$_3$ and SrWO$_4$.

2. A non-chromate protective coating solution according to claim 1 comprising:
   from 50 to 75 wt. % H$_2$O;
   from 10 to 14 wt. % H$_3$PO$_4$;
   from 2 to 5 wt. % MgO;
   from 15 to 35 wt. % Al; and
   from 0.5 to 2 wt. % V$_2$O$_5$.

3. A non-chromate protective coating solution according to claim 1 comprising:
   from 50 to 75 wt. % H$_2$O;
   from 8 to 12 wt.% H$_3$PO$_4$;
   from 2 to 5 wt. % MgO;
   from 20 to 40 wt. % Al; and
   from 5 to 10 wt. % Ce$_2$(MoO$_4$)$_3$.

4. A non-chromate protective coating solution according to claim 1 comprising:
   from 50 to 75 wt. % H$_2$O;
   from 8 to 12 wt. % H$_3$PO$_4$;
   from 2 to 5 wt. % MgO;
   from 20 to 40 wt. % Al; and
   from 5 to 10 wt. % SrWo$_4$.

5. A non-chromate protective coating solution according to one of claim 1, 2, 3 or 4 wherein the solution has a pH of between 2.5 to 5.0.

6. A non-chromate protective coating solution according to one of claim 1, 2, 3 or 4 wherein the solution has a pH of between 3.0 to 4.0.

7. A composite comprising a metal substrate coated with a non-chromate protective coating, said non-chromate protective coating comprising:
   from 15 to 40 wt. % H$_3$PO$_4$;
   from 3 to 20 wt. % MgO;
   from 20 to 75 wt. % Al; and
   from 1.0 to 20 wt. % of a metal oxide selected from the group consisting Of V$_2$O$_5$, Ce$_2$(MoO$_4$)$_3$ and SrWO$_4$.

8. A composite according to claim 7, wherein said non-chromate protective coating comprising:
   from 15 to 25 wt. % H$_3$PO$_4$;
   from 3 to 10 wt. % MgO;
   from 30 to 60 wt. % Al; and
   from 1 to 5 wt. % V$_2$O$_5$.

9. A composite according to claim 7, wherein said non-chromate protective coating comprising:
   from 13 to 20 wt. % H$_3$PO$_4$;
   from 3 to 10 wt. % MgO;
   from 35 to 70 wt. % Al; and
   from 7 to 20 wt. % Ce$_2$(Mo0$_4$)$_3$.

10. A composite according to claim 7, wherein said non-chromate protective coating comprising:
    from 13 to 20 wt. % H$_3$PO$_4$;
    from 3 to 10 wt. % MgO;
    from 35 to 70 wt. % Al; and
    from 7 to 20 wt. % SrWO$_4$.

11. A composite according to one of claim 7, 8, 9 or 10, wherein said metal substrate is selected from the group consisting of iron and iron alloys.

* * * * *